United States Patent [19]

Obester

[11] Patent Number: 4,727,777

[45] Date of Patent: Mar. 1, 1988

[54] VEHICLE-MOUNTED SUPPORT FOR SHARPENING CHAIN SAWS

[76] Inventor: John Obester, 33B - 951 Cedar Street, Campbell River, British Columbia, Canada, V9W 2W1

[21] Appl. No.: 895,172

[22] Filed: Aug. 11, 1986

[30] Foreign Application Priority Data

Aug. 12, 1985 [CA] Canada .................................. 488485

[51] Int. Cl.<sup>4</sup> ............................................ B23D 61/00
[52] U.S. Cl. .................................... 76/78 A; 51/217 R
[58] Field of Search ................. 76/78 R, 78 A, 25 A, 76/25 R; 51/216 R, 217 R, 217 P, 217 T, 238 R; 269/102; 30/296 A

[56] References Cited

U.S. PATENT DOCUMENTS 3,877,324  4/1975  Silvey .................................. 76/25 A
4,248,412  2/1981  DeRoy ................................. 76/78 R Primary Examiner—Roscoe V. Parker
Attorney, Agent, or Firm—Chernoff, Vilhauer, McClung & Stenzel

[57] ABSTRACT

A support for sharpening chain saws which can be mounted on the fender of a pick-up truck provides a convenient platform for sharpening the chain saw in the field or in the bush which can be readily swung out of the way when not in use. The support includes provisions for adjusting the height of the platform above the ground and for securing the chain saw in place for sharpening.

4 Claims, 8 Drawing Figures

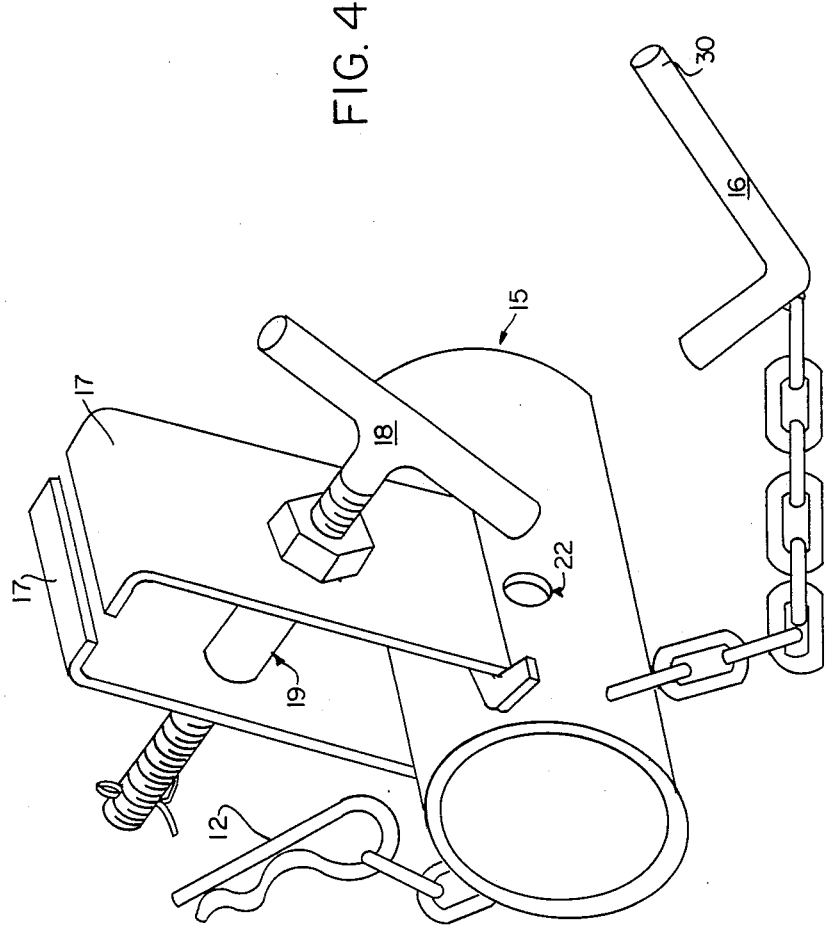

VEHICLE-MOUNTED SUPPORT FOR SHARPENING CHAIN SAWS

BACKGROUND OF THE INVENTION

The invention relates to tables or platforms for supporting and securing saws, such a chain saws, for sharpening, and more particularly to a platform for supporting a chain saw during sharpening which can be mounted on a vehicle such as a pick-up truck.

The cutting teeth on saw chains require frequent sharpening, and frequently such sharpening must be done by the operator in the field or in the bush so that he can maintain optimum performance of the chain saw. No convenient means has been available to the chain saw operator for such sharpening in the field. The operator would either support the cutter bar across his knee or perhaps on a log to sharpen the chain. This has made the sharpening of the chain saw an awkward, difficult and time-consuming task. Generally chain saw operators will be travelling by pick-up truck in the field or in the bush, but it has not been contemplated in the past to provide a device on the pick-up truck for securing a chain saw for sharpening. There has therefore been a need for a device which can be installed on a pick-up truck which will provide a secure and stable surface for sharpening chain saws.

SUMMARY OF THE INVENTION

The present invention provides a support on which a chain saw may be mounted for sharpening which can be installed on the pick-up truck fender. The support comprises a base member adapted for securing to the pick-up truck fender, a vertical member secured to said base member, a horizontal member rotatably fixed at one end to the vertical member for rotation thereabout, and a surface on the horizontal member for supporting a chain saw. The horizontal member may thereby be rotated to a position away from the pick-up truck fender when in use for sharpening the chain saw, and may be rotated back to a position paralled to the fender when not in use. The support may include a clamp at the end of the horizontal member for securing the end of the chain saw guide bar. The height of the horizontal member may be adjustable on the vertical member and means may be provided on the pick-up truck fender for holding the end of the horizontal member when not in use. The surace on which the chain saw is mounted on the horizontal member may also be rotatable so that it may be rotated to a position flush against the pick-up truck body when the support is not in use.

BRIEF DESCRIPTION OF THE DRAWINGS

In drawings which illustrate an embodiment of the invention:

FIG. 4 is a perspective view showing the guide bar clamp in detail;

DETAILED DESCRIPTION OF AN EMBODIMENT OF THE INVENTION

Figure 1:
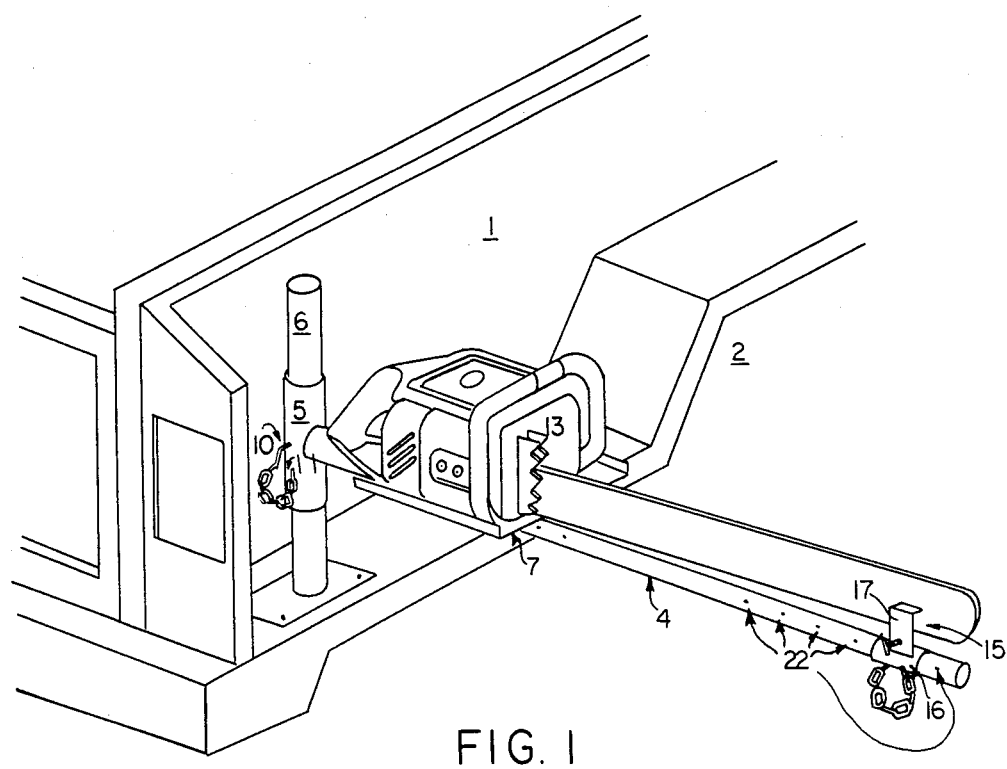
FIG. 1 is a perspective view of the chain saw support of the invention mounted on a pick-up truck fender with a chain saw in position for sharpening.
Figure 2:
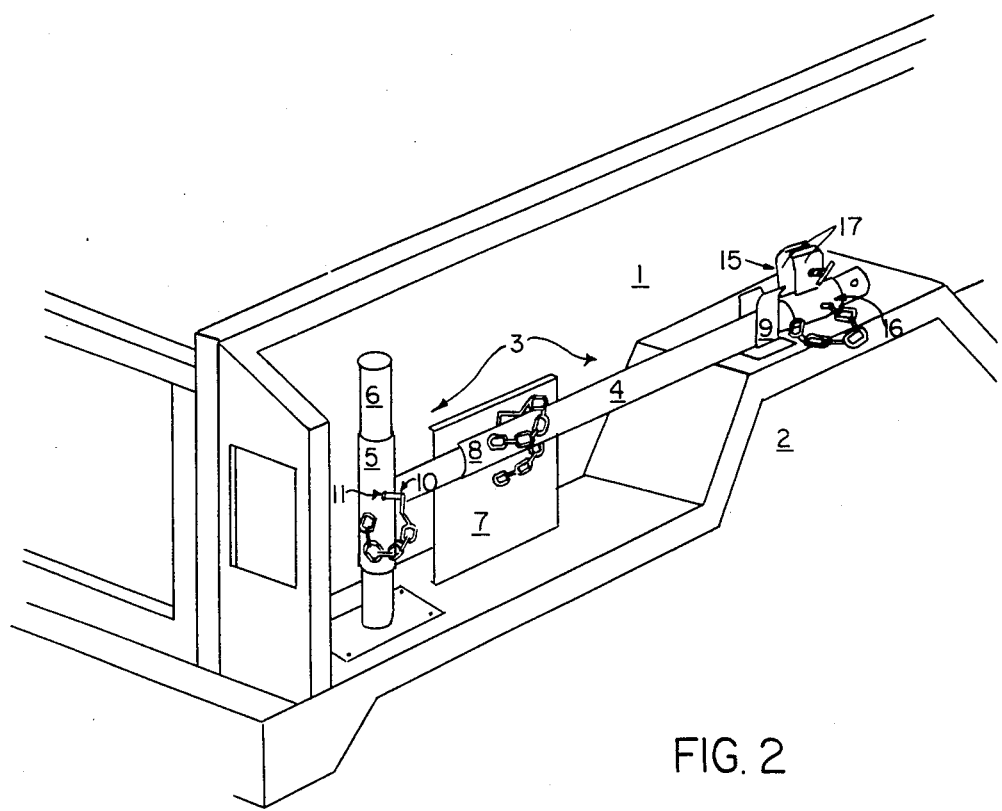
FIG. 2 is a perspective view showing the chain saw support mounted on a pick-up truck fender in storage position.

Referring to FIGS. 1 and 2, the box of a pick-up truck 1 is shown with the wheel well indicated at 2. The chain saw support is shown in FIG. 2 in its storage position, indicated generally as 3. The chain saw support consists essentially of an extended bar or pipe 4 which is secured at one end to a cylindrical length of pipe 5. Pipe 5 is co-axially mounted for rotation on vertical pipe 6 which is secured at its base to the fender of the pick-up truck. A surface for supporting the chain saw, saw table 7, is in turn supported on pipe 4. The saw table is adapted for rotation on pipe 4 by being fixed to length of pipe 8 which is in turn coaxially mounted on pipe 4 in a manner such that it is free to rotate. Clamp 15 securely holds the end of the chain saw guide bar in place on pipe 4.

Figure 3:
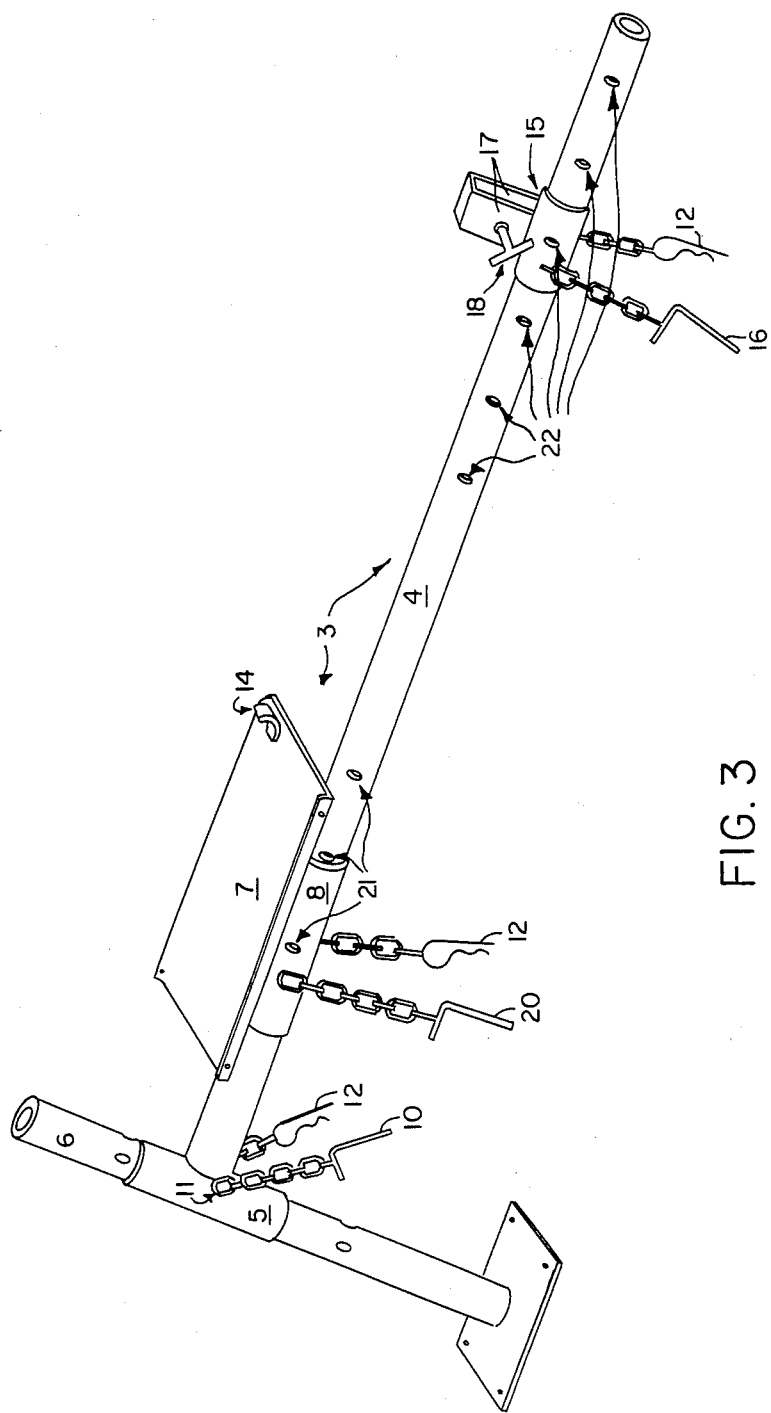
FIG. 3 is a perspective view of the chain saw support of the invention shown separately from the pick-up truck.

FIG. 1 shows the support in position for sharpening a chain saw which is indicated as 13. Pipe 4 has been rotated to a position perpendicular to the pick-up truck body. A pin 10 is inserted through hole 11 in pipe element 5 and a corresponding hole in vertical pipe 6 to secure it in this position so that it cannot rotate nor move vertically. Saw table 7 has been rotated to a horizontal position to support the motor housing of the chain saw. A strap may be used to hold the chain saw securely on the saw table. Referring to FIG. 3, the front handlebar of the chain saw is held in place by brace 14. The saw table is held in the horizontal position by inserting pin 20 through holes 21 in pipe element 8 and pipe 4. Pin 20 is in turn prevented from falling out of the hole 21 by a pin 12 which is inserted in a hole in the end of pin 20. A similar pin 12 may also be used in conjunction with pin 10. A number of holes 21 are provided in pipe 4 so that the position of the saw table on the pipe may be varied.

Clamp 15, shown in more detail in FIG. 4, also consists of a length of pipe which rotates co-axially on pipe 4. The clamp is provided with two flanges 17 which can be tightened against the chain saw guide bar by screw 18. The clamp holds the guide bar, while allowing the chain to travel freely. A piece of rubber hose 19 is provided on screw 18 to protect the chain from contact with the screw. The clamp may be positioned in a number of locations on pipe 4. Its position is fixed by inserting pin 16 through hole 22 in the clamp and a corresponding hole in pipe 4. The end of pin 16 is inserted completely through the pipe section of clamp 15 and pipe 4 and pin 12 is inserted through hole 30 in the end of pin 16 to hold it in place. (Pin 12 is not shown in scale in the drawings.)

In FIG. 2 the support is shown in the stored position. Pin 10 is removed from hole 11 and pin 20 removed from hole 21. Saw table 7 is allowed to rotate to a vertical position. Pipe 4 is rotated to a position parallel to the pick-up truck body. It is raised slightly on vertical pipe 6 to permit the end of pipe 4 to clear the first of flanges 9 on wheel well 2. It is then allowed to sit in between the two flanges 9 where it is held for storage while travelling. Pin 10 is re-inserted into hole 11 and a corresponding hole in pipe 6 to secure the support in the stored position.

Figure 7:
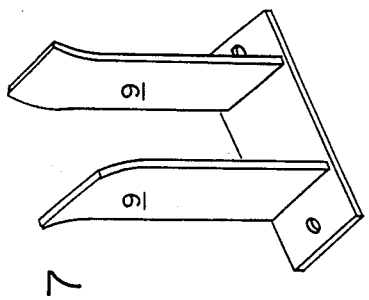
FIG. 7 is a perspective view showing the member for holding the end of the horizontal bar on the pick-up truck in storage position.
Figure 6:
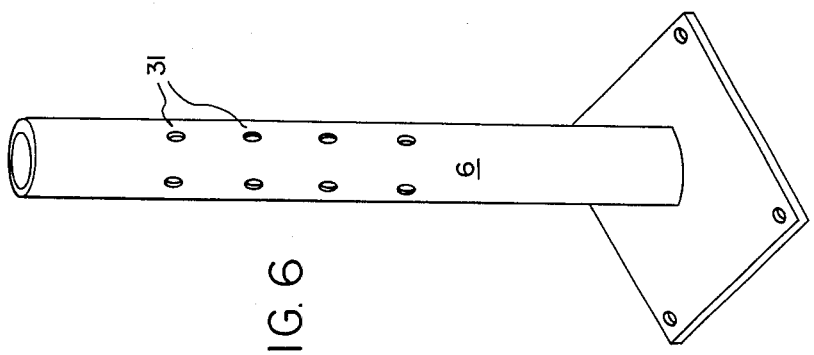
FIG. 6 is a perspective view showing the vertical member adapted for mounting on a pick-up truck fender.
Figure 5:
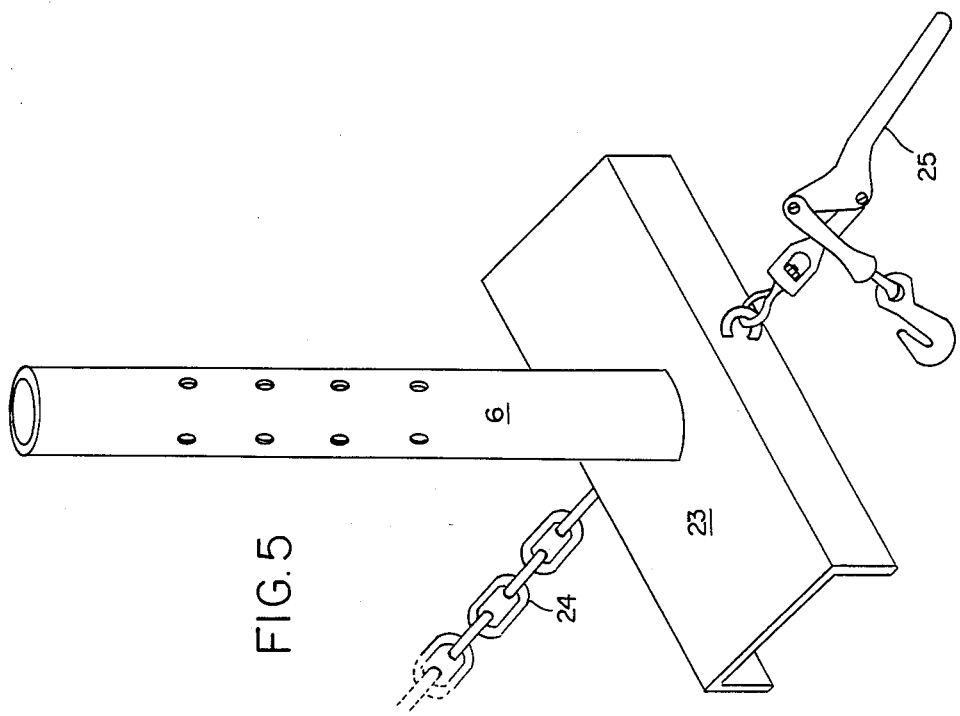
FIG. 5 is a perspective view showing a vertical member of the invention adapted for mounting on a log or similar surface.

FIG. 6 shows vertical pipe 6 having a number of pairs of holes 31 to permit variation of the vertical height of the support. Two holes are required at each location to allow the support to be secured in both the storage and operation positions. FIG. 7 shows a more detailed view of storage flanges 9.

FIG. 7 shows a second embodiment of the invention wherein the support is adapted for mounting on a log rather than a pick-up fender. A base plate 23 is provided which can be tightened on a log using chain 24 and a chain-tightening cinch 25. Once the base plate 23 has been tightened on the log, pipe 5 with attached chain saw supporting elements can then be slipped over pipe 6 and the chain saw secured to the saw table as before for sharpening.

Figure 8:
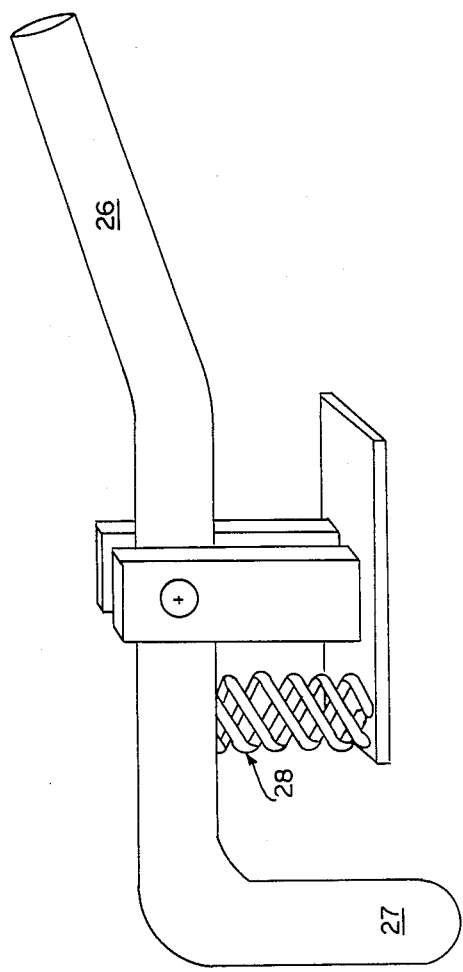
FIG. 8 illustrates a self-locking pin which may be utilized in the invention.

FIG. 8 shows a self-locking pin arrangement which can be utilized in the invention in place of pins 10, 12, 16 and 20 when attached at appropriate locations on the device. A spring 28 is provided to hold the end of the pin 27 in the selected holes. To adjust the chain saw support, handle 26 is depressed, pin end 27 is removed from the hold and the height or angle of the saw support is adjusted. When the desired location is found, handle 26 is released and spring 28 draws pin end 27 into the selected holes.

As described above the invention provides a solid support on a pick-up truck fender or log on which the chain saw can be securely mounted to permit vigorous and effective sharpening action. The saw chain remains free to rotate for sharpening. When mounted on the pick-up truck fender, the support is readily stored out of the way when not in use.

As will be apparent to those skilled in the art, various modifications of the invention may be made without departing from the scope of the invention which is defined in the appended claims.

The embodiments of the invention in which an exclusive property or privilege is claimed are defined as follows:

1. A support on which a chain saw may be mounted for sharpening comprising:
    (a) a base member adapted for securing to a stable horizontal surface such as a pick-up truck fender;
    (b) a vertical member secured to said base member;
    (c) horizontal member rotatably fixed at one end to said vertical member for rotation thereabout;
    (d) a surface on said horizontal member for supporting a chain saw; and
    (e) means at the end of said horizontal member opposite said vertical member for securing the end of the guide bar of said chain saw while permitting free movement of the saw chain whereby said horizontal member may be rotated to a position away from said pick-up truck fender when said support is in use and rotated to a position parallel to said pick-up truck fender when said support is not in use.

2. The chain saw support of claim 1 further comprising means on said pick-up truck fender for securing said horizontal member in said position parallel to said pick-up truck fender.

3. The chain saw support of claim 1 further comprising means for adjusting the height of said horizontal member on said vertical member.

4. The chain saw support of claim 3 wherein said supporting surface is mounted for rotation on said horizontal member.